United States Patent
Dharmapurikar

(12) 
(10) Patent No.: US 9,240,030 B2
(45) Date of Patent: Jan. 19, 2016

(54) METHOD AND MECHANISM FOR PERFORMING BOTH SERVER-SIDE AND CLIENT-SIDE RENDERING OF VISUAL DATA

(75) Inventor: Makarand Dharmapurikar, Fremont, CA (US)

(73) Assignee: Google Inc., Mountain View, CA (US)

( * ) Notice: Subject to any disclaimer, the term of this patent is extended or adjusted under 35 U.S.C. 154(b) by 655 days.

(21) Appl. No.: 13/491,930

(22) Filed: Jun. 8, 2012

(65) Prior Publication Data

US 2013/0147819 A1 Jun. 13, 2013

Related U.S. Application Data

(60) Provisional application No. 61/495,147, filed on Jun. 9, 2011.

(51) Int. Cl.
*G06T 1/20* (2006.01)
*G06T 9/00* (2006.01)
*H04N 19/27* (2014.01)

(52) U.S. Cl.
CPC ... *G06T 1/20* (2013.01); *G06T 9/00* (2013.01); *H04N 19/27* (2014.11); *G06T 2200/16* (2013.01)

(58) Field of Classification Search
CPC ..... G06T 15/005; G06T 1/20; G06T 2210/32; G06F 9/5044; G06F 3/1288; G06F 3/1289
USPC ......................................................... 345/522
See application file for complete search history.

(56) References Cited

U.S. PATENT DOCUMENTS

| | | | |
|---|---|---|---|
| 6,377,257 B1 * | 4/2002 | Borrel et al. | 345/419 |
| 8,035,636 B1 | 10/2011 | Yang | |
| 2004/0041810 A1 | 3/2004 | Peacock et al. | |
| 2004/0100466 A1 | 5/2004 | Deering | |
| 2006/0082583 A1 | 4/2006 | Leichtling et al. | |
| 2006/0125848 A1 | 6/2006 | Alcorn et al. | |
| 2009/0138544 A1 * | 5/2009 | Wegenkittl et al. | 709/203 |
| 2009/0144775 A1 | 6/2009 | Rosin et al. | |
| 2009/0189891 A1 * | 7/2009 | Rivera et al. | 345/419 |
| 2011/0010455 A1 * | 1/2011 | Wolfe et al. | 709/226 |

OTHER PUBLICATIONS

International Search Report and Written Opinion dated Aug. 10, 2012, for International Patent Application No. PCT/US 12/41521.

* cited by examiner

*Primary Examiner* — Edward Martello

(57) ABSTRACT

Disclosed is an approach for providing an improved approach for rendering graphics that can utilize both server-side rendering and client-side rendering for the same display frame. In this way, the different visual objects within the same frame can be rendered using either approach, either at the server or at the client.

34 Claims, 15 Drawing Sheets

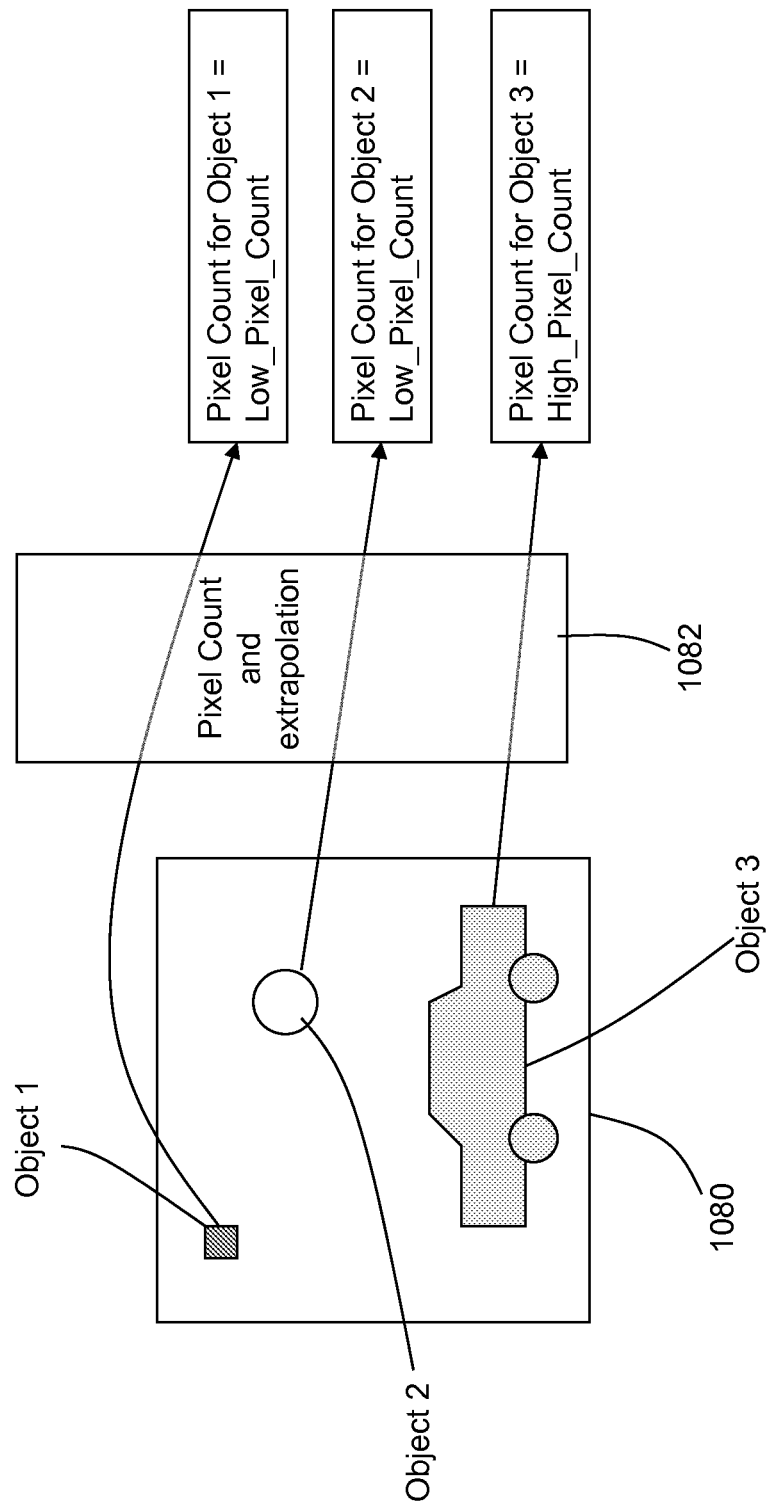

METHOD AND MECHANISM FOR PERFORMING BOTH SERVER-SIDE AND CLIENT-SIDE RENDERING OF VISUAL DATA

CROSS-REFERENCE TO RELATED APPLICATIONS

The present application claims the benefit of U.S. Provisional Application 61/495,147, filed on Jun. 9, 2011, which is hereby incorporated by reference in its entirety.

FIELD

The invention relates to the field of remote rendering.

BACKGROUND

3D Graphics rendering systems, such as gaming PCs and gaming devices follow a standard architecture that typically includes:
1. CPU subsystem—it includes the main processor, memory and storage
2. Graphics subsystem—it includes the graphics processor (GPU) and associated memory
3. A Display subsystem that is connected to the GPU The CPU subsystem and the GPU subsystem are connected through a high speed bus, such as PCI, AGP or PCI-Express. The GPU subsystem is connected to the Display through another high speed interface such as HDMI, DVI, or Display Port. The role of these components can be thought of as the CPU being responsible for describing the content at an abstract level and the GPU is responsible for rendering the content in a pixel form. The Display is responsible for visually showing the pixels to the user.

Typically, the main program generating the graphics, such as a game program, is run on the CPU where the game program listens to user input from keyboard or game pad. The game program executes the game logic and then sends commands to the GPU telling the GPU how to create a picture (also called as frame) that will be shown on the Display. This process is repeated several times every second to create an appearance of smooth motion on the Display. Typically it is repeated 30 times a second. This figure is also knows as refresh rate.

It is GPU's job to execute the commands sent by the CPU. Commands can be roughly categorized as "simple commands" that GPU can execute by itself, "indirect commands" that refer to data residing in the CPU's memory (known as System Memory), or commands that read the data generated by the GPU.

Typically the volume of data going from the CPU to GPU, and the system memory to GPU, far outweighs the data coming from the GPU to CPU. The performance of the GPU, and therefore the quality of the gaming experience, is directly proportional to the number of frames the GPU can process per second. The data transfer bandwidth between the CPU/System Memory and the GPU plays a crucial role in this performance. If the interface between the CPU and GPU is slow, this data transfer can be a bottleneck that will hurt performance. The pace of innovation in this interface (ISA, PCI, AGP, PCIE 1.0, PCIE 2.0, PCIE 3.0) has been brisk. A typical gaming system today has bandwidth of up to 4 Gbytes/Second.

The nature of the CPU-GPU and the GPU-Display interface has required that the CPU, GPU and Display be part of the same system to guarantee the best performance. This limitation has implications for system design, such as power consumption, size, portability, cooling requirements and noise.

For these and other reasons, there is interest in the graphics community to find ways physically to separate the CPU, GPU and Display, in a way that does not require re-writing of applications. Possible solutions range from physical separation at the electrical level, to software solutions that operate at higher levels.

The problem becomes even more complicated in a networked environment, in which the user may be remote from a server that houses the main program which generates the graphics. For example, many of the most popular modern applications are interactive multi-user games applications, in which the users' computing systems are connected by a network to a centralized game program on a remote server. The user interacts with the game program by providing inputs from the user's local computer system, but the visual contents that are seen by the user are instituted by the operations of the remote game program on the server, which are then locally displayed to the user on the user's local display device.

One possible approach to implement this type of networked system is to require the CPU and GPU at the server to generate and render video data at the server-side that will be sent to the client computer, and which will utilize the video decoder at the client to be displayed at the client-side. This approach is shown in FIG. 1, in which the CPU and GPU processors 102a located at the server 108 take on the entirety of the work needed to render the display graphics, so that only a stream of video display pixels 110 are sent to the client to be displayed by the video decoder 106a at the client.

Alternatively, remote rendering may be employed to offload some of the rendering workload to the client. This approach is shown in FIG. 2, in which the CPU 102b at the server 108 is responsible for operating the game logic, but it is the GPU 106b at the client that takes care of processing graphics data 112 sent from the server 108 to locally render visual graphics to be displayed to the user.

Each of these approaches has its own specific advantages and disadvantages. For example, if the local GPU is excessively underpowered (e.g., inadequate processor speed) or has insufficient system resources (e.g., insufficient memory), then the display performance using the approach of FIG. 2 may be much less desirable than the approach of FIG. 1. On the other hand the approach of FIG. 2 may provide much better performance than the approach of FIG. 1 under certain circumstances that can take advantage of the local GPU, e.g., display frames which do not undergo many changes will require much less network bandwidth in the approach of FIG. 2 compared to the approach of FIG. 1. While each approach has its own set of advantages compared to the other, there are no existing systems that can combine the best advantages of both into a single system.

SUMMARY

Some embodiments of the present invention provide an improved approach for rendering graphics that can utilize both server-side rendering and client-side rendering for the same display frame. In this way, the different visual objects within the same frame can be rendered using either approach, either at the server or at the client.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIGS. 10A-E illustrate an approach for performing both server-side and client-side rendering.

DETAILED DESCRIPTION

Some embodiments of the present invention are directed to an improved approach for rendering graphics that can utilize both server-side rendering and client-side rendering for the same display frame. In this way, the different visual objects within the same frame can be rendered using either approach, either at the server or at the client.

Figure 1:
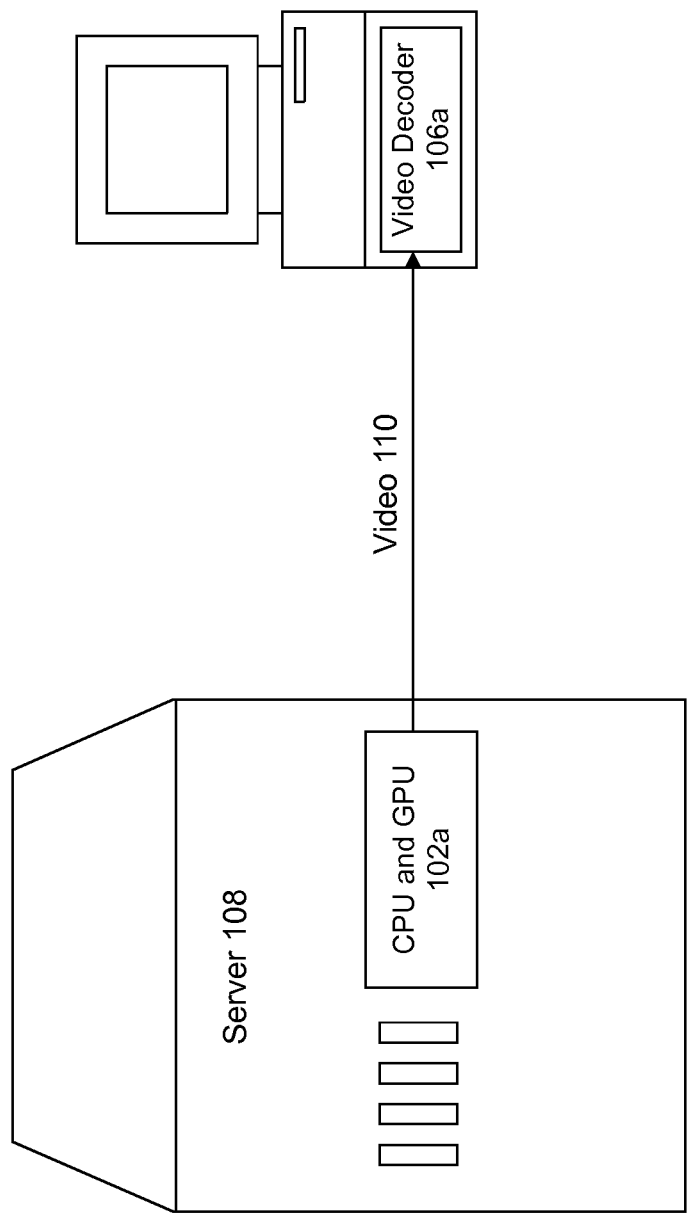
FIG. 1 illustrates an example approach for performing server-side rendering.
Figure 2:
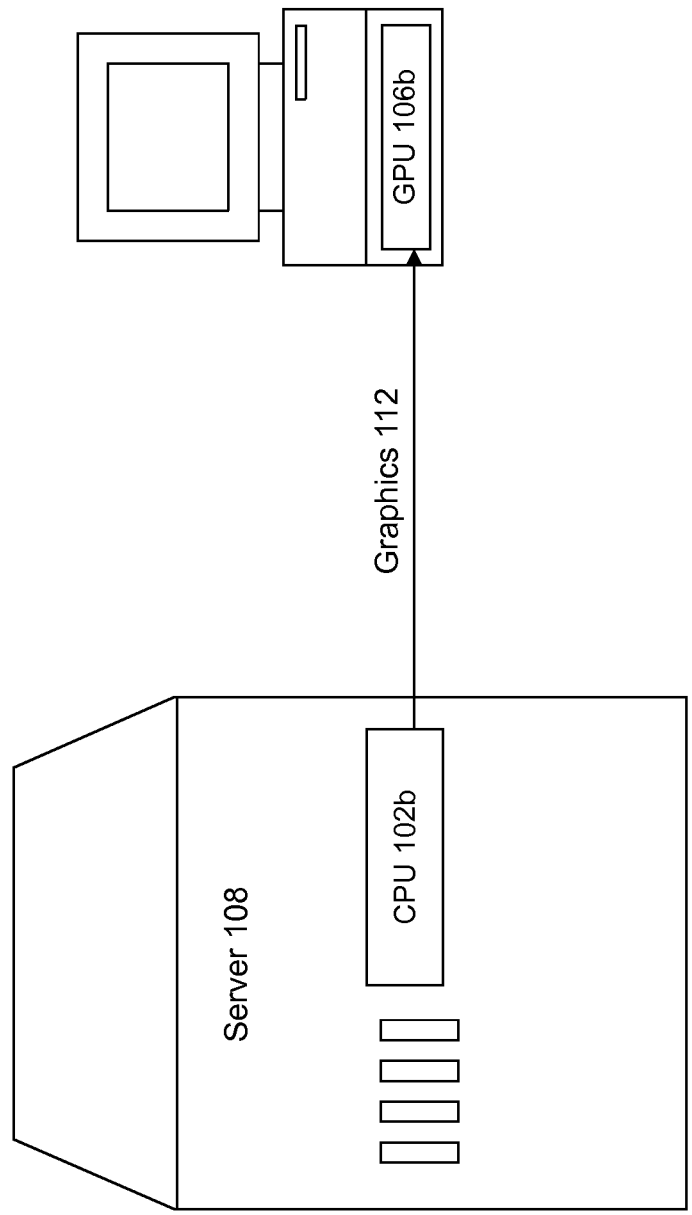
FIG. 2 illustrates an example approach for performing client-side rendering.
Figure 3:
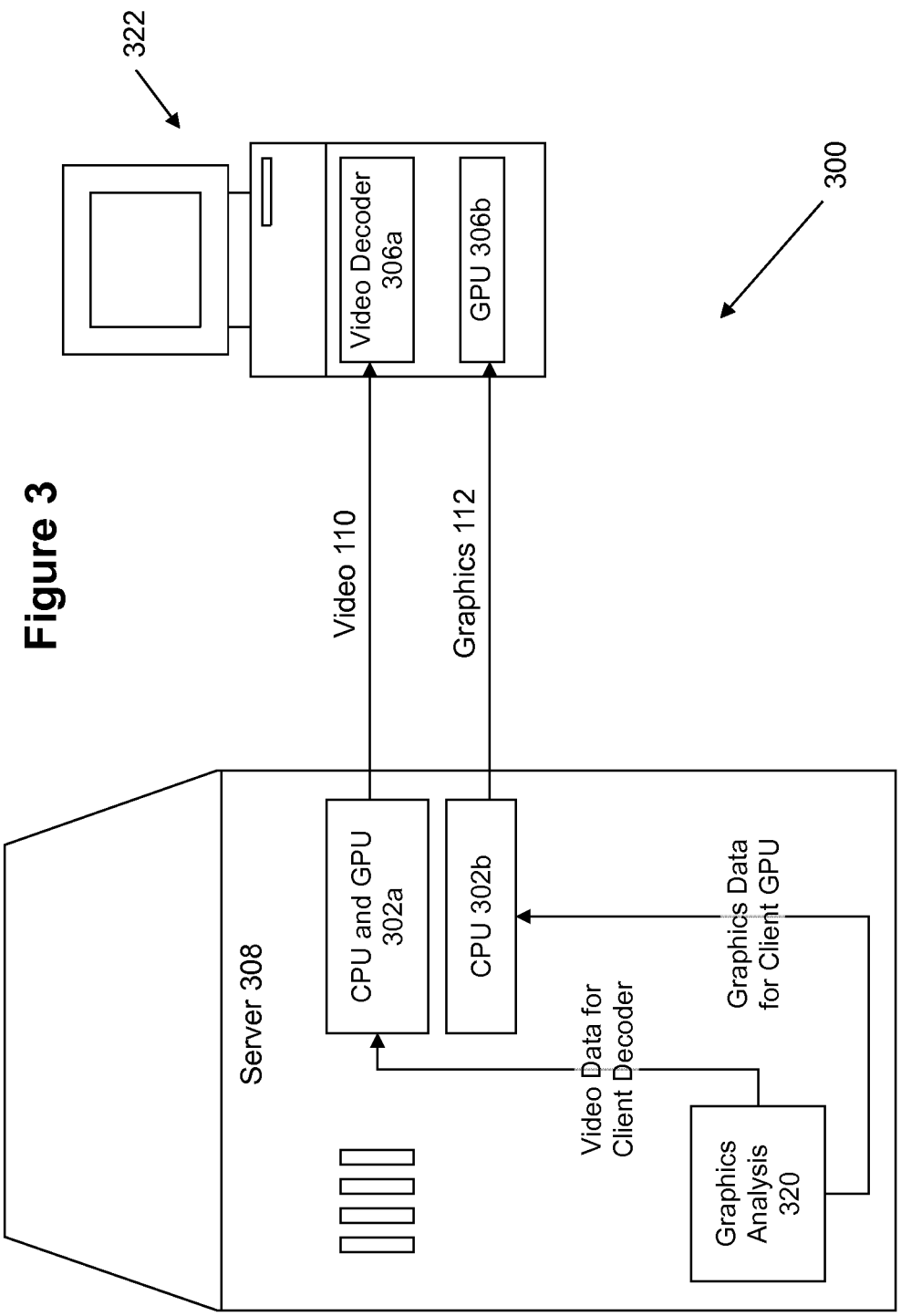
FIG. 3 illustrates an example architecture for performing both server-side and client-side rendering.

FIG. 3 illustrates an example architecture 300 which may be employed in some embodiments of the invention to render graphics across a network. Architecture 300 may include one or more users at one or more client station(s) 322 that operate or utilize a central program at a server 308. Such central programs include, for example, networked game programs. Client station 322 comprises any type of computing station that may be used to operate or interface with a central program at server 308. Examples of such client stations 322 include for example, workstations, personal computers, remote computing terminals, or dedicated gaming platforms.

The client station 322 comprises a display device, such as a display monitor, for displaying visual graphics to users at the client station 322. Client station 322 also comprises one or more input devices for the user to provide operational control over the activities of client station 322 and architecture 300, such as a mouse or keyboard to manipulate a pointing object in a graphical user interface.

The client station 322 comprises both a video decoder 306a and a GPU 306b. The video decoder 306a can be used to display a stream of video data 110 in any suitable video format. The GPU 306b can be used to render graphics at the client station 322 based upon graphics data 112.

The server 308 comprises a graphics analysis module 320 that includes components to analyze the visual data intended to be displayed by a central program, and to determine whether the visual data should undergo rendering at the server 308 or remote rendering at the client station 322.

If the graphics analysis module 320 determines that local rendering should be performed at the server 308, then the combination of the CPU and GPU 302a at the server 308 is employed to render the graphics. The server-based CPU would describe the visual content at an abstract level and the server-based GPU would render the content in a pixel form into video data 110. The video data 110 is sent to the client station 322, where the client-based video decoder 306a processes the pixel data for display on the client's display device.

If the graphics analysis module 320 determines that remote rendering should be performed at the client station 322, then the CPU 302b at the server 308 is employed to generate graphics data 112 at an abstract level (e.g., using graphics commands with vector data rather than raster data), and the graphics data 112 is sent to the client station 322. The client-based GPU 306b processes the graphics data 112 to render the visual content in a pixel form, which is then immediately displayed on the client's display device.

According to some embodiments of the invention, the graphics analysis module 320 can operate to mix and match how objects even within the same frame are rendered. Thus, the same frame may include some objects that are rendered at the server 308 using the server-based CPU and GPU 302a, while other objects are rendered at the client 322 using the client-side GPU 306b.

Figure 4:
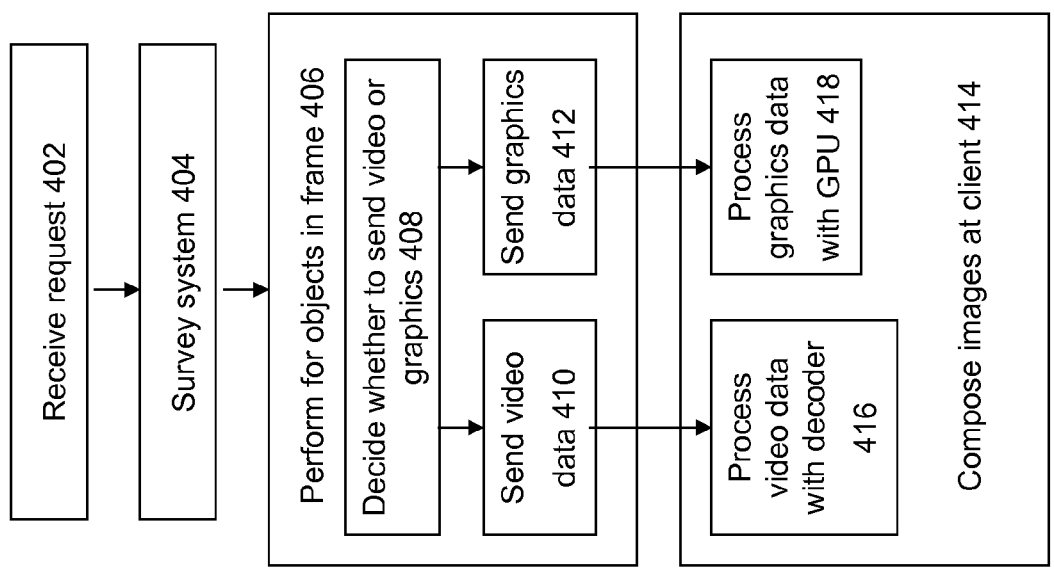
FIG. 4 illustrates a flowchart of an approach for performing both server-side and client-side rendering.

FIG. 4 shows a flowchart of an approach for implementing mixed server-client rendering according to some embodiments of the invention. At 402, a request is received to display visual content at the client station. The request comprises any suitable set of operations or commands that relates to visual content that would need to be rendered for display at the client station. For example, in the gaming context, the request could result from the game software determining that the visual scene to be displayed to the user needs to be changed in some way.

At 404, a survey is performed of the architecture/system to determine the capabilities of the system for performing either/both server-side rendering or client-side rendering. For example, this action can be taken to identify the specific GPU that exists at the client station or to determine the status or resource availability (e.g., GPU memory) of the GPU at the client station.

For the objects in the frames to be displayed, the actions of 406 are performed to determine, at 408, whether server-side rendering or client-side rendering is to be performed. For server-side rendering, the CPU and GPU at the server are employed to render the pixel data, and therefore the resultant video data is streamed to the client as described at 410. For client-side rendering, the CPU at the server is used to provide an abstract determination of the visual display, but graphics data is sent to the client station for rendering by the client-based GPU as described at 412.

As used herein, the term "object" refers to any suitable granularity of data for rendering. For example, the object could comprise any object or entity to be displayed on a screen, e.g., a discrete object (such as an action figure) within a display frame. The object could also correspond to an area of display real estate having a bounded set of coordinates. The object could also correspond to a specific command/API function call (or a set of such commands/calls) that relates to display of an entity on the screen).

Certain objects will naturally lend themselves to be more efficiently handled one way versus the other. For example, it is likely that background scenes that do not change very often will be more efficiently rendered using the client-based GPU. This is because the data for the background objects will likely already reside at the client-side memory cache, and any changes in the display will likely only differ in terms of the viewing angle or position for the background objects rather than any actual changes in the objects themselves. Therefore, compared to the relatively high cost of sending server-rendered pixel data across the network for the background objects (requiring high network bandwidth), it would be much cheaper to send the graphics data comprising only the commands/calls to display the background objects from a different angle (which requires low network bandwidth) and to allow rendering to occur at the client with the client-based GPU.

On the other hand, objects that are subject to a larger amount of dynamic visual changes (e.g., because of animation) may lend themselves to be more efficiently handled by server-side rendering. This is because in this situation, the cost of sending a stream of server-rendered pixels as video data may be cheaper than sending a stream of vector data (which is also dynamically changing) and which then needs to be rendered at the client.

Regardless, it is likely that some of the objects will be rendered at the client side and some rendered at the server side. At 414, the image frames are composed from the different sets of data sent to the client. In particular, at 416, the video data is processed for display by the client-side video decoder. At 418, the graphics data is processed with the client-side GPU.

Figure 5:
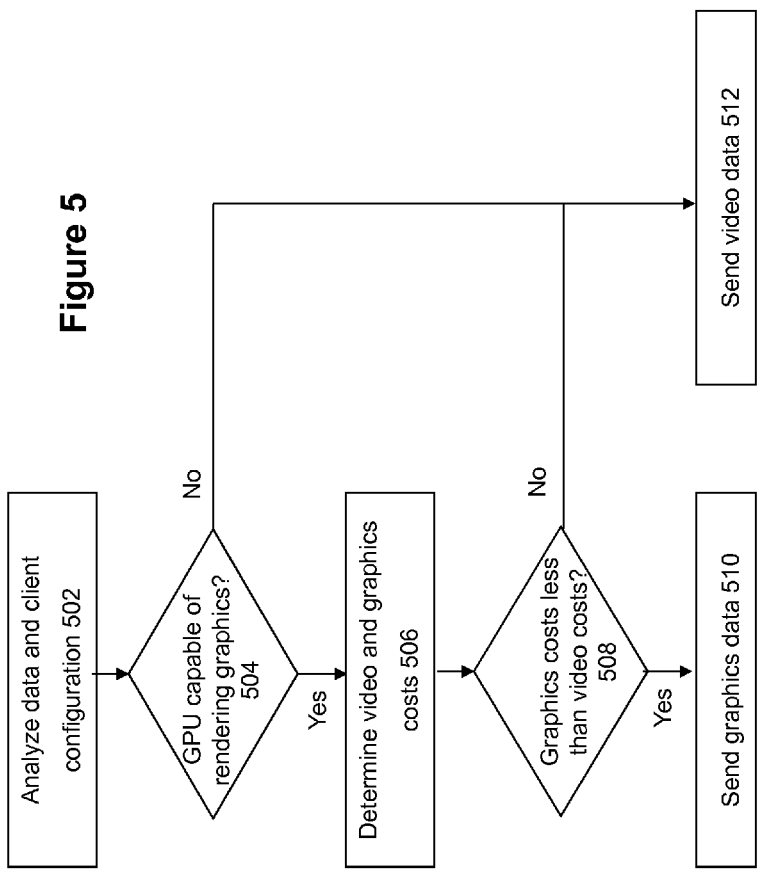
FIG. 5 illustrates a flowchart of an approach for determining whether to perform server-side and client-side rendering for an object.

FIG. 5 shows a flowchart of an approach for determining whether server-side rendering or client-side rendering is to be performed. At 502, analysis is performed of the data and client configurations. This action involves an analysis of the visual data to be rendered as well as the details of the GPU resources at the client.

At 504, a determination is made whether the GPU is capable of rendering the visual data. If not, then the process proceeds to 512 to perform server-side rendering so that video data is sent to the client.

If the GPU is intrinsically capable of rendering the visual data, an additional determination is made at 506 of the costs for performing the server-side rendering and the client-side rendering. According to some embodiments, the costs for both approaches would be calculated using a common unit of measurement to facilitate comparisons. For example, the costs cold be calculated in some embodiments in units of "bits per second."

At 508, a comparison of the different costs is performed to determine which approach provides a relatively more efficient mechanism to render the visual data. If the server-side rendering costs are relatively less expensive, then server-side rendering is performed to send video data to the client at 512. On the other hand, if client-side rendering costs are relatively less expensive, then graphics data is sent to the client at 510 so that the client-side GPU can be used to performed client-side rendering.

Figure 6:
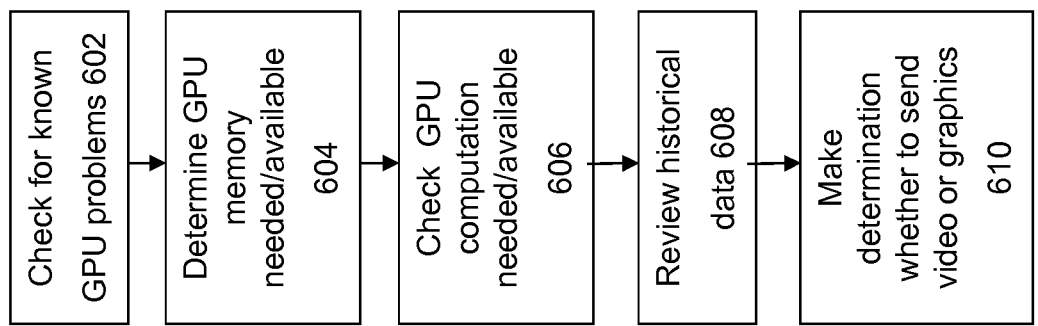
FIG. 6 illustrates a flowchart of an approach for determining whether a client-side GPU is capable of rendering an object.

FIG. 6 shows a flowchart of an approach for determining whether the GPU is capable of rendering the visual data for a given object or set of objects in a frame. At 602, a check is made whether there are any known problems for the specific GPU type/model at the client that would prevent the client GPU from performing the desired rendering activities. For example, it is possible that there are known bugs with certain GPUs that negatively affect the GPU's ability to implement certain types of rendering operations. If the desired rendering of the current set of visual data relates to these known bugs, then this situation would weight against performing client-side rendering.

At 604, statistics monitoring is performed to determine the amount of GPU memory that is available at the client. A determination is also made of any additional GPU memory that may be required if client-side rendering is performed. For example, if data for the object to be displayed is already within the GPU memory cache and it did not change, then minimal or no additional memory may be needed. On the other hand, if the data for the object is not already within the GPU memory or if that data has changed, then additional GPU memory may be needed. If the available GPU memory is insufficient to handle additional memory requirements to perform client-side rendering, then server-side rendering is performed.

At 606, a check is made of the available GPU computation resources, as well as the computation needs to perform client-side rendering. In some embodiments, this action is performed by checking the current percentage of GPU utilization and comparing the "busy" percentage to the expected GPU utilization needed to perform the desired client-side rendering. If the required resource consumption exceeds the available resources, then server-side rendering is performed.

Historical data may also be checked at 608 to determine whether there are additional factors that need to be considered to see if an object is renderable at the client. For example, the expected GPU processor and memory utilization levels for certain objects that have successfully passed the checks of 604 and 606 may nevertheless have historically resulted in sub-optimal display performance in the past. Therefore, in some embodiments, historical analysis can also be used to determine whether an object should or should not be rendered at the client.

At 610, the above factors are considered to determine whether the client-side GPU is capable of rendering the display object.

Figure 7:
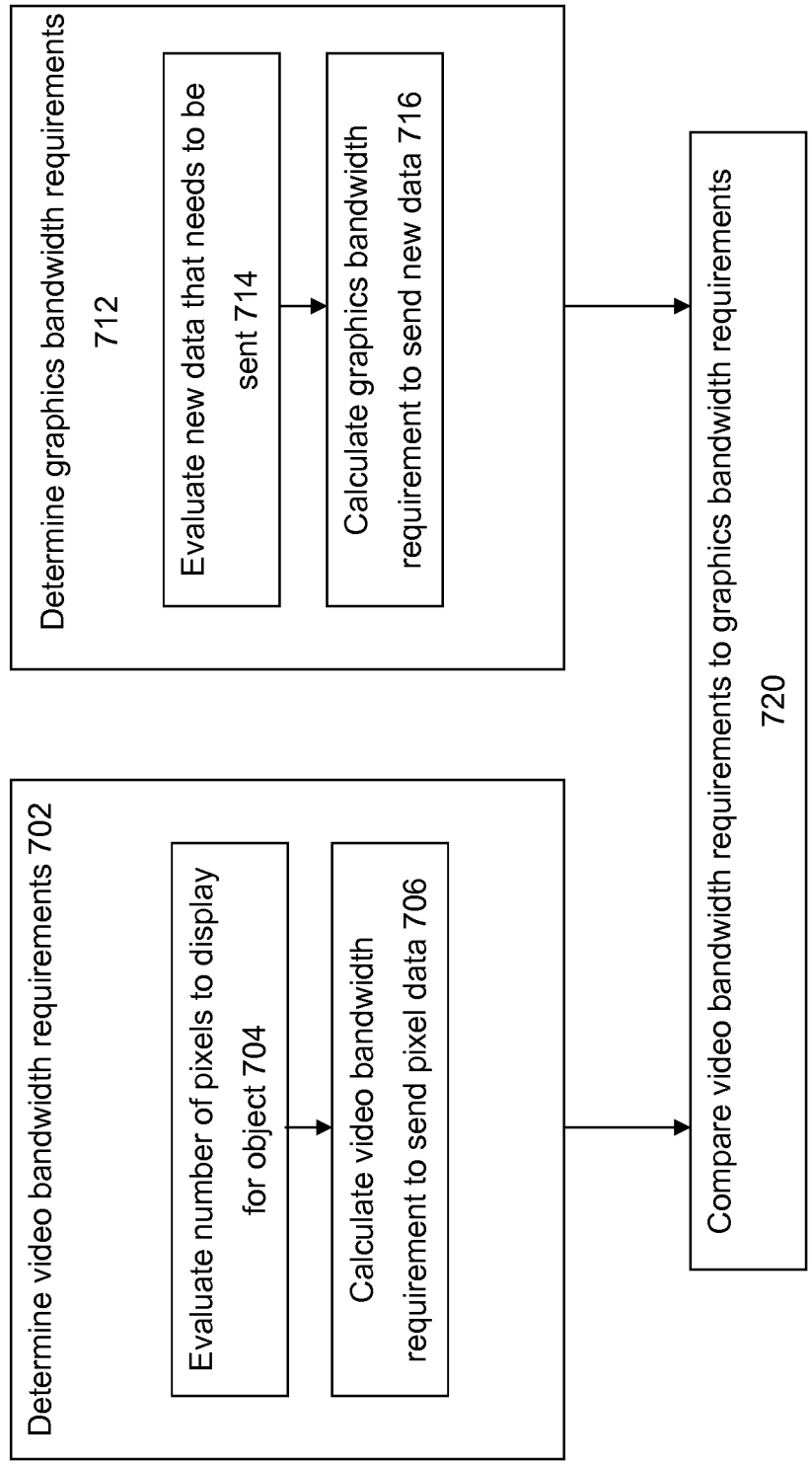
FIG. 7 illustrates a flowchart of an approach for determining costs of performing server-side and client-side rendering.

Any suitable approach can be taken to perform costs calculations for server-side and client-side rendering. For example, costs can be determined according to the bandwidth utilization needs of each approach. FIG. 7 shows a flowchart of an approach for determining and comparing the costs of performing client-side and server-side rendering when considered according to the bandwidth utilization needs of each approach. The path 702 along the left side of the flowchart corresponds to determination of the server-side rendering costs and the path 712 along the right side of the flowchart corresponds to determination of the client-side rendering costs.

To determine server-side rendering costs, path 702 is performed by first evaluating, at 704, the number of pixels that need to be displayed for the object (or set of objects) under examination. This action can be performed by identifying the size/configuration of the object in question, and then determining the number of pixels. For example, an object that is bound by a rectangular box of 100 pixels by 100 pixels corresponds to a total of 10000 pixels. Next, at 706, calculations are performed to determine the bits/second bandwidth needs to transmit those identified pixels in a given period of time.

To determine client-side rendering costs, path 712 is performed by evaluating, at 714, the quantity of graphics data that would need to be transmitted to the client to allow rendering to occur at the client. If the graphics data for the object that is needed for the desired rendering operations already reside at the client side (and there are no or minimal changes to that data), then only a small amount of data may need to be sent across the network from the server to the client. On the other hand, for visual display of animation, it is possible that the object data may be changing frequently, which means that a very large amount/rate of graphics data would need to be sent to the client to allow the desired rendering to occur with the client GPU. At 716, calculations are performed to determine the bits/second bandwidth needs to transmit the quantity of data in the given period of time.

A comparison is performed at 720 to determined the relative costs of performing the server-side and client-side rendering for the object being examined. If the relative costs are such that it is cheaper to perform client-side rendering, then graphics data will be sent from the server to the client so that the client-side GPU is used to render the visual data. On the other hand, if the relative costs are such that it is cheaper to perform server-side rendering, then the server-side GPU is used to render the visual data, and therefore video data will be sent from the server to the client so that the client-side video decoder is used to only display the data.

The above-actions are performed successively for the different objects in a frame so that the optimal mixture of client-side and server-side rendering is performed to render and display the visual data.

This document will now describe an advanced approach for determining whether to use client-side and server-side rendering for rendering drawing objects. The general idea is that a cost function will be applied to determine the relative efficiencies of either approach for a given object to be drawn in an image frame. In some embodiments, the cost function is based at least in part on the number of pixels associated with the object to be drawn and the amount of relative bandwidth that is consumed by either approach to display those pixels at the client.

Figure 8:
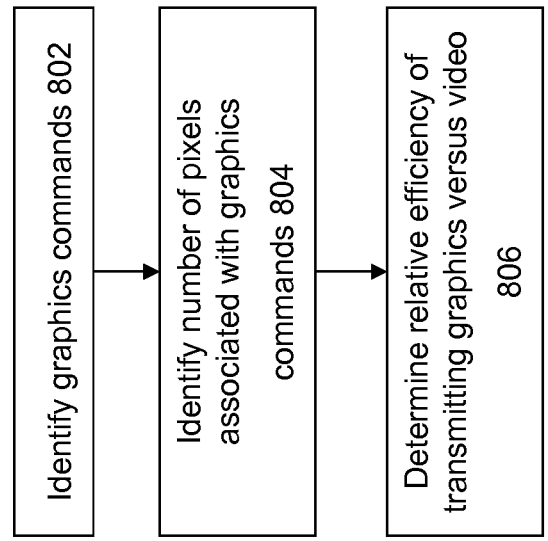
FIG. 8 shows a flowchart of an approach for estimating costs of server-side versus client-side rendering.

FIG. 8 shows a flowchart of this approach for estimating costs of server-side versus client-side rendering, according to some embodiments of the invention. At 802, the graphics commands are identified that will be analyzed to determine whether to use server-side versus client-side rendering. This action looks at an image frame to be displayed at the client, and identifies the graphics commands that are associated with that image frame.

Next, at 804, an evaluation is performed to identify the number of pixels that are expected to be displayed as a result of executing the graphics commands. As previously discussed, the number of pixels will affect the amount of bandwidth that is consumed to display those pixels at the client. This is because there is a potential tradeoff between the bandwidth required to send graphics commands to render those pixels at the client versus the bandwidth needed to send pre-rendered pixels as video to be displayed at the client.

At 806, the number of pixels is used to determine the relative efficiency of for transmitting the image frame as either graphics or video. For example, one possible approach is to evaluate efficiency using the following equation:

Efficiency=(Number of visible pixels)/(bandwidth needed to transmit pixels)

If the efficiency value derived from this equation is at or above a specified threshold, then the frame is sent as graphics to be rendered at the client. On the other hand, if the efficiency measure is less than the threshold value, then the image frame is rendered at the server, and the image frame is rendered at the server and sent to the client as video/pixels.

The threshold value(s) for comparison to the efficiency value can be selected according to any set of suitable parameters. For example, the type and quality of the network, client machine resources, server resources, relative server/client workloads, and user preferences may be taken into account in adjusting the threshold levels.

In addition, the threshold does not need to be a fixed value. This means that the threshold value may differ across different portions of an image frame, e.g., between background image elements and foreground image elements. In addition, the threshold may change across different image frames, on the time of the day, or based on other factors such as whether the image frames are being transmitted at peak network usage times or during periods of low network usage times.

Figure 9:
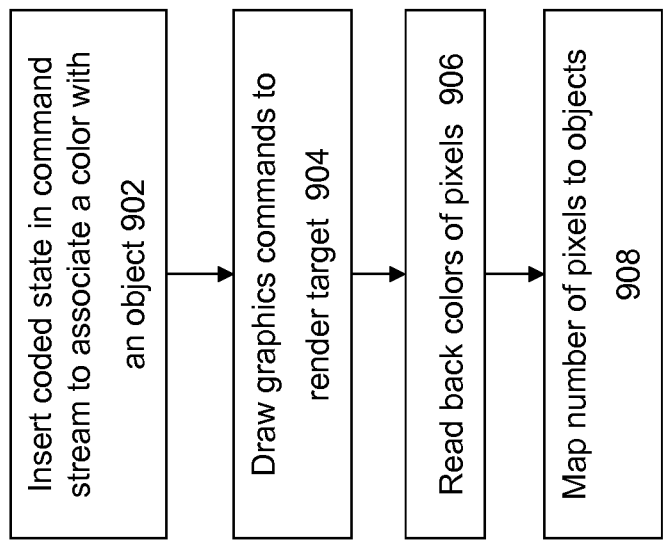
FIG. 9 shows a flowchart of an approach for evaluating the number of pixels associated with graphics commands.

FIG. 9 shows a flowchart of an approach for evaluating the number of pixels associated with graphics commands. At 902, special codes state(s) are inserted into the graphics command stream to associate unique colors with the different objects in the image frame. These code states will cause the objects to be drawn with the colors that have been designated for those objects. In effect, each different object will now be drawn with a color that is different from any other object.

Next, at 904, the graphics commands are executed at the server to draw a small "render target." A render target is a buffer where the video card draws pixels for a scene that is being rendered. In the current approach, the render target is an "offscreen" render target that does not need to have the same width and height as the eventual target display. As such, the graphics commands are rendered in small render targets having smaller widths and heights to very quickly draw a representation of the image frame. The render target also has a surface format, which describes how many bits are allocated to each pixel and how they are divided between the different colors.

At 906, the colors of the various pixels are identified for the image frame. Because each object was associated with a different color, this means that each drawn object should be associated with pixels having a different color in the drawn image frame in the render target. As a result, there should be a detectable number of pixels for every color associated with a visibly drawn object.

The number of visible pixels that correspond to each drawn object is determined at 908. This action involves first identifying the number of pixels of a given color that map to a particularly object. Because the render target is smaller than the eventual final image, the number of pixels would be scaled upwards to estimate the actual number of pixels that would be associated with each object. This estimated number of pixels would be used, as described above, to calculate the efficiency of performing rendering at either the server side or the client side.

Figure 10A:
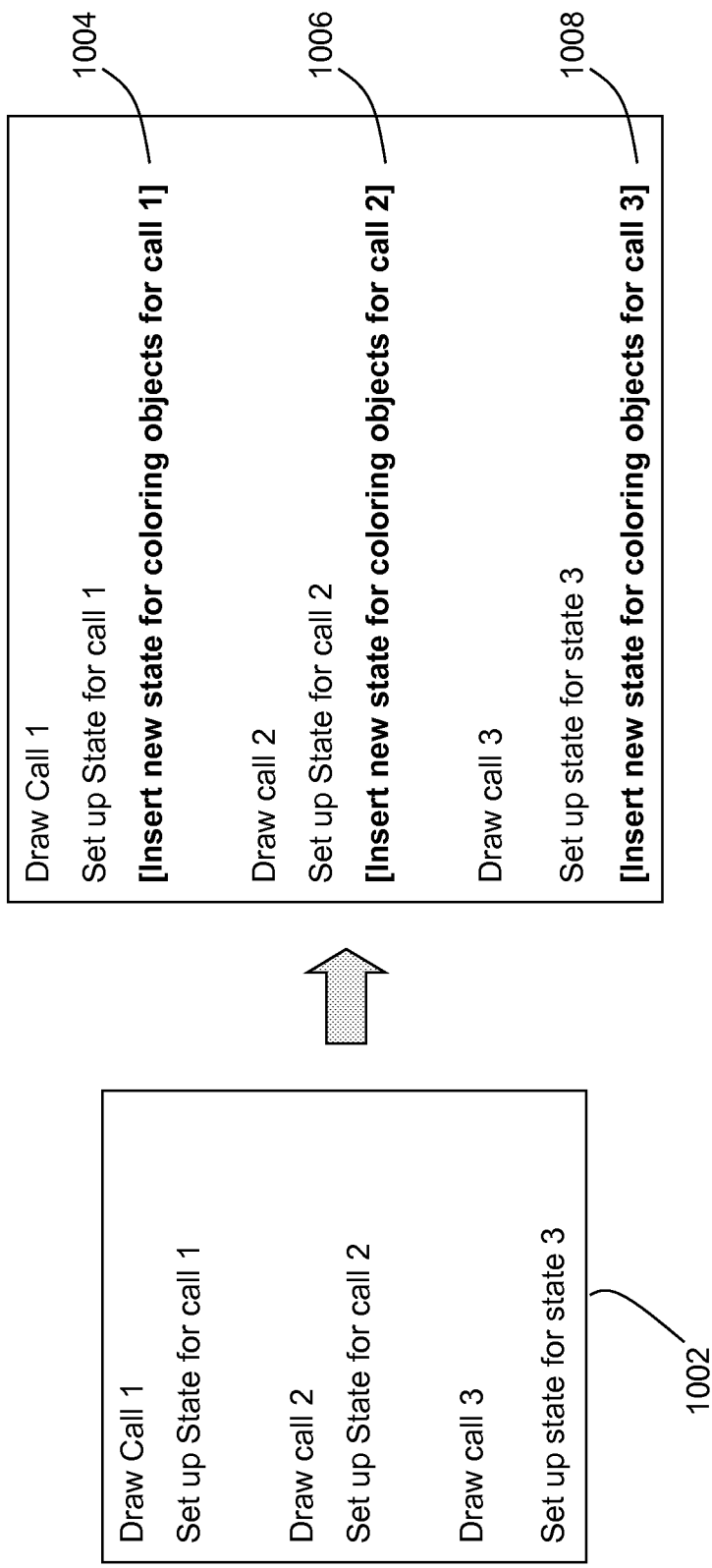

FIGS. 10A-E illustrate this approach for performing server-side and client-side rendering. FIG. 10A shows an initial set 1002 of graphics commands that has been identified for analysis. As discussed above in step 902, special coded states are inserted into the graphics commands to associated unique colors to the different objects to be drawn. In this example, statement 1004 is inserted to associate a first color with an object 1 to be drawn. Similarly, statement 1006 is inserted to associate a second color with an object 2 and statement 1008 is inserted to associate a third color with an object 3.

Figure 10B:
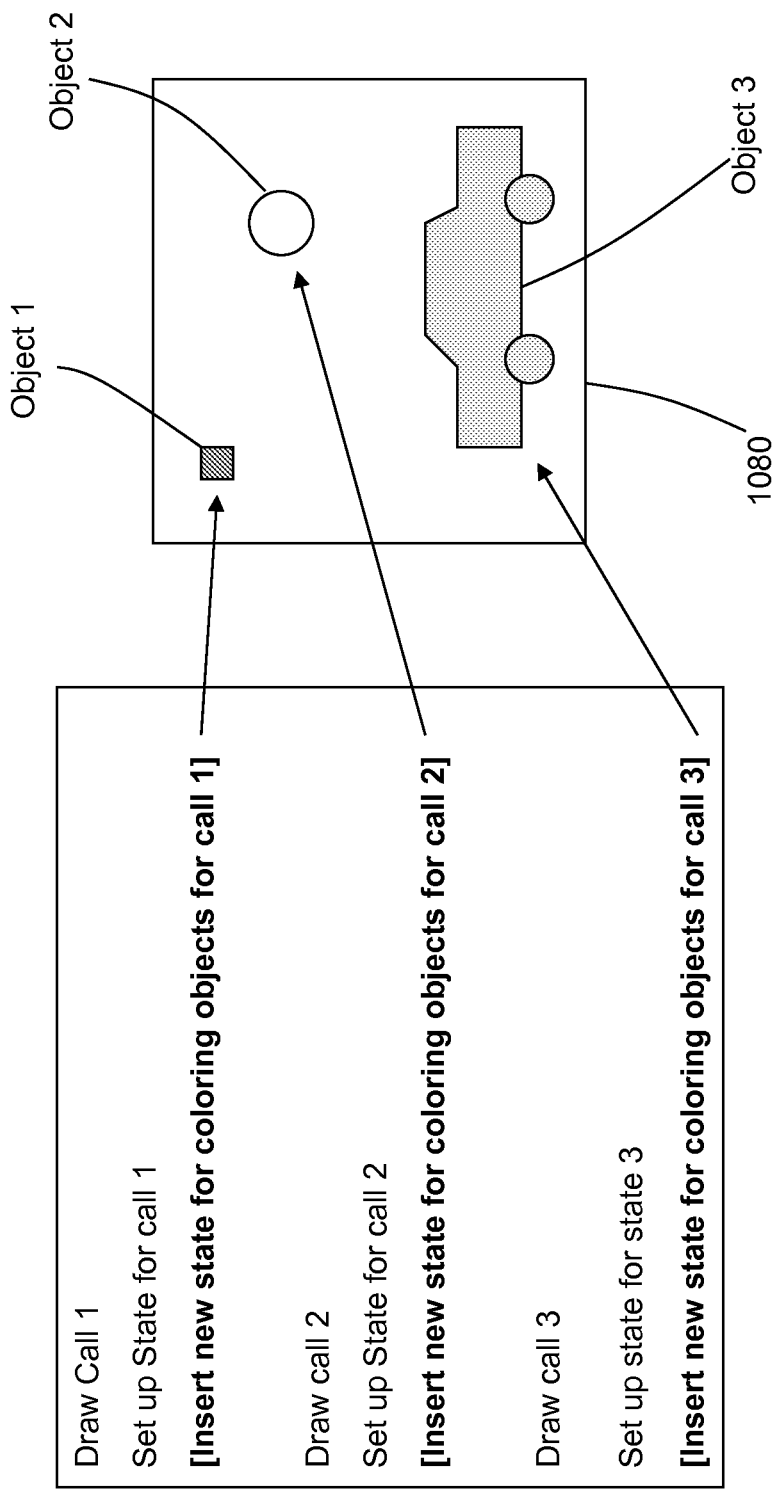

FIG. 10B illustrates the action of executing the graphics commands to draw the image frame into a small render target 1080 on the server. In particular, objects 1, 2, and 3 have been drawn in the small render target 1080, where each object is associated with a color that differs from the other objects.

As shown in FIG. 10C, a pixel count 1082 is performed for each drawn object in the render target 1080. This is accomplished by reading the color of each pixel in the render target 1080, and then calculating the number or percentage of pixels for each object in the image frame. Since the size of the render target is smaller than the expected final image frame. Extrapolation is performed scale the pixel count for each object upwards to estimate the eventual pixel count for each object 1, 2, and 3 in the image frame.

In the current example, it can be seen that objects 1 and 2 are quite small. Therefore, in the current example, these objects are associated with relatively low pixels counts. On the other hand, object 3 is quite large, and is hence associated with a relatively high pixel count.

Figure 10D:
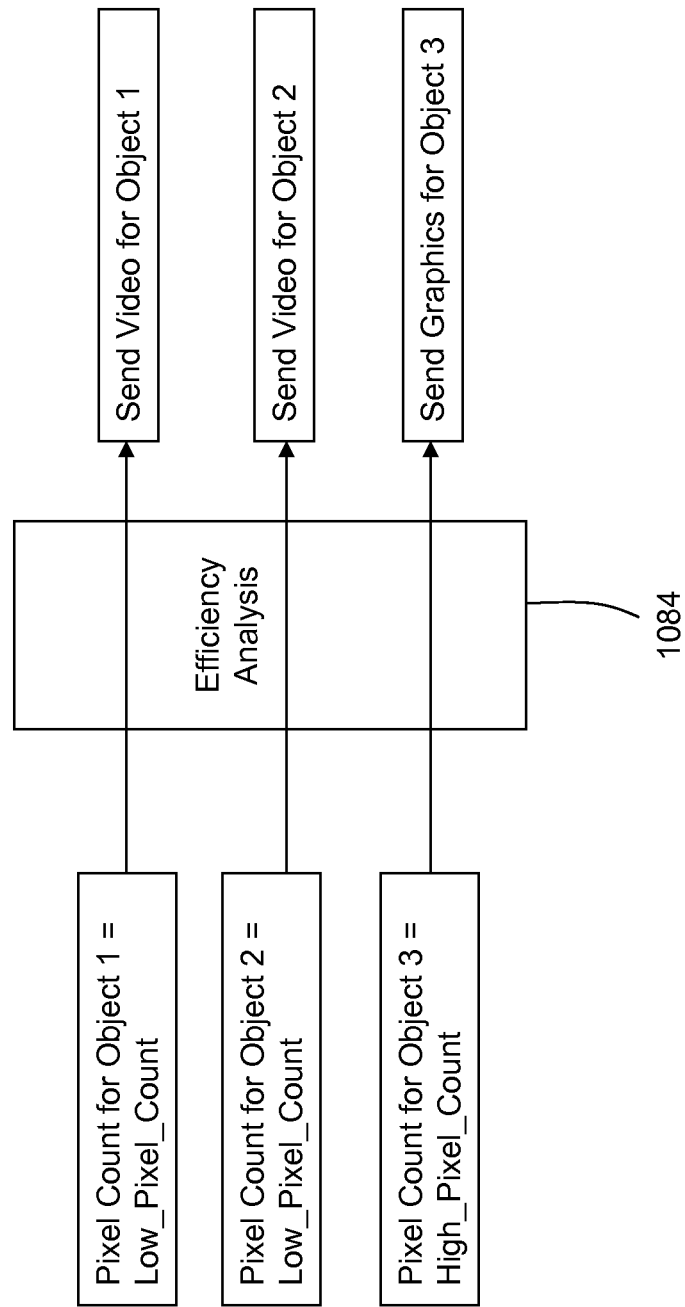

As shown in FIG. 10D, an efficiency analysis 1084 is performed to determine which portions of the image frame should be rendered at the server versus being rendered at the client. In general, a lower pixel count for an object will be more likely to result in a determination that minimal bandwidth is required to send those pixels to a client. This would tend to result in analysis results to support server-side rendering, in which video is sent to the client for those low-pixel objects. A higher pixel count for an object will more likely result in a determination that excessive bandwidth is required to send pixels to a client. This would tend to result in analysis results to support client-side rendering, in which graphics are sent to the client for those high-pixel objects.

In the current example, it was previously determined that objects 1 and 2 are quite small and are therefore associated with relatively low pixels counts. In the current example, this resulted in a determination that it would be more efficient to send these objects as video to the client. On the other hand, object 3 is quite large and was therefore associated with a relatively high pixel count. In the current example, this resulted in a determination that it would be more efficient to send object 3 as graphics to the client.

Figure 10E:
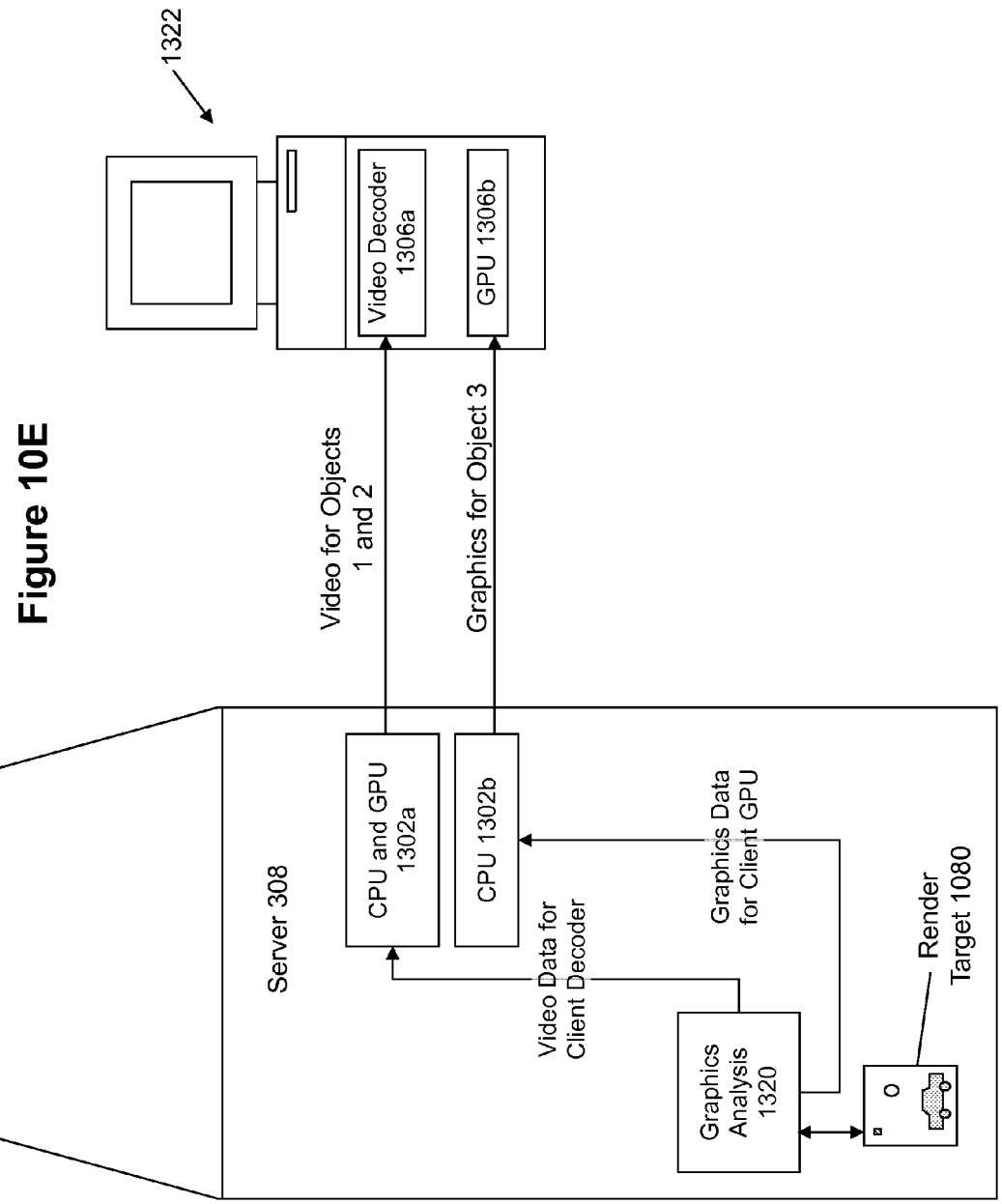

FIG. 10E illustrates this scenario, in which graphical analysis 1320 was performed to generate the small render target 1080 at the server 1308. The analysis results generated by the graphics analysis 1320, as described above, resulted in a determination that it would be more efficient to render objects 1 and 2 at the CPU/GPU 1302a at the server 1308, so that these objects are sent as video to the client 1322 to be displayed at the client-side by video decoder 1306a. The analysis results generated by the graphics analysis 1320, also resulted in a determination that it would be more efficient to send object 3 as graphics to the client 1322 to be rendered client-side by GPU 1306b at client 1322.

Therefore, what has been described is an improved approach for rendering visual data. The invention allows a system to mix and match the different rendering approaches so that an optimal distribution of work is provided among the different processing components in the system. The analysis can be performed on a frame-by-frame, object-by-object basis. The present approach is quite advantageous in that it is flexible and can dynamically consider the trade-offs of either performing server-side rendering or client-side rendering.

System Architecture Overview

Figure 11:
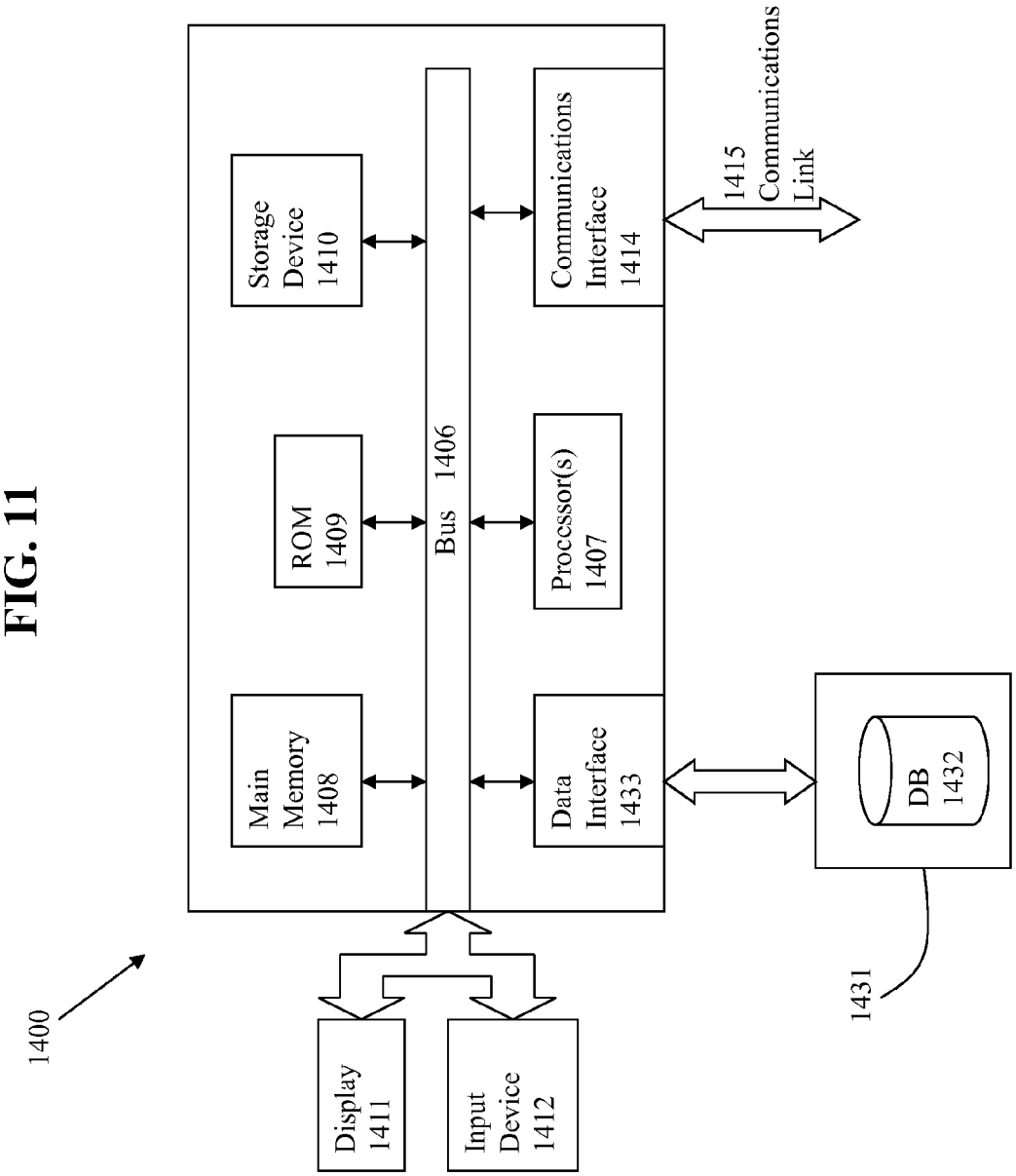
FIG. 11 depicts a computerized system on which an embodiment of the invention can be implemented.

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), data interface 1433, and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for determining whether to perform client-side rendering or server-side rendering on visual data in a client-server system with a client and a server, comprising:
   identifying, by the server, a plurality of objects in a frame associated with the visual data;
   identifying, by the server, graphics commands for each of the plurality of objects associated with the visual data;
   determining, by the server, a number of pixels for each of the plurality of objects to be displayed as a result of executing the graphics commands, the number of pixels being based on visual changes in an object of the plurality of objects;

determining, by the server, a first efficiency for each of the plurality of objects based on rendering the visual data as pixels at the server and transmitting the pixels to the client;

determining, by the server, a second efficiency for each of the plurality of objects based on transmitting and rendering the visual data as pixels at the client;

determining, by the server, a relative efficiency for each of the plurality of objects for transmitting the visual data as pixels, the relative efficiency being a comparison of the first efficiency to the second efficiency;

upon determining the relative efficiency for the object of the plurality of objects meets or exceeds a threshold value, sending, by the server, the visual data for the object of the plurality of objects as graphics commands to be rendered at the client; and upon determining the relative efficiency for the object of the plurality of objects falls below the threshold value, rendering, by the server, the visual data for the object of the plurality of objects at the server and sending, by the server, the rendered visual data for the object of the plurality of objects to the client.

2. The computer implemented method of claim 1, wherein the relative efficiency is determined by comparing the number of pixels to be displayed with an amount of bandwidth needed to transmit the number of pixels to be displayed.

3. The computer implemented method of claim 1, wherein the threshold value accounts for network type, network quality, client resources, server resources, client workloads, server workloads, or user preferences.

4. The computer implemented method of claim 1, wherein the threshold value varies across different portions of an image.

5. The computer implemented method of claim 1, wherein the visual data corresponds to an image frame.

6. The computer implemented method of claim 5, wherein the determining the number of pixels to be displayed comprises:

inserting codes into the graphics commands associated with the visual data to associate unique colors with different objects in the image frame;

executing the graphic commands at the server to generate pixels for a render target;

identifying colors of the pixels generated for the render target; and identifying a number of visible pixels for each different object of the image frame.

7. The computer implemented method of claim 6, wherein the codes inserted into the graphics commands associated with the visual data will cause the different objects in the image frame to be drawn with colors designated for the different objects.

8. The computer implemented method of claim 6, wherein the render target has a smaller width and height than an eventual target display for the visual data.

9. The computer implemented method of claim 6, wherein the render target has a surface format that describes a number of bits allocated to each pixel of the pixels generated for the render target and how the number of bits are divided between the unique colors.

10. The computer implemented method of claim 6, wherein identifying the number of visible pixels for each drawn object of the image frame comprises:

identifying a number of pixels for a color of the unique colors that maps to an object of the different objects; and scaling the number of pixels for the color of the unique colors for an eventual target display for the visual data.

11. The computer implemented method of claim 1, wherein the identifying of the plurality of objects in a frame associated with the visual data includes:

drawing a the frame as a rendered target having a smaller width and a smaller height that a width and height associated with the frame; and identifying each of the plurality of objects in the frame based on pixel colors.

12. The computer implemented method of claim 11, wherein the determining of the number of pixels for each of the plurality of objects includes scaling a number of pixels associated with the rendered target upwards based on a size difference between the rendered target and the frame.

13. The computer implemented method of claim 11, wherein the sending of the visual data for the object of the plurality of objects as graphics commands to be rendered at the client includes generating, by the server, graphics data using graphics commands with vector data rather than raster data and sending the graphics data to the client, and the rendering of the visual data for the object of the plurality of objects at the server includes rendering the object of the plurality of objects in a pixel form into video data.

14. The computer implemented method of claim 11, wherein sending, by the server, the visual data includes both sending rendered visual data and sending commands to be rendered at the client.

15. A computer program product comprising a non-transitory computer readable medium, wherein the computer readable medium comprises executable program code for implementing a method for determining whether to perform client-side rendering or server-side rendering on visual data in a client-server system with a client and a server, the method comprising:

identifying, by the server, a plurality of objects in a frame associated with the visual data;

identifying, by the server, graphics commands for each of the plurality of objects associated with the visual data;

determining, by the server, a number of pixels for each of the plurality of objects to be displayed as a result of executing the graphics commands, the number of pixels being based on visual changes in an object of the plurality of objects;

determining, by the server, a first efficiency for each of the plurality of objects based on rendering the visual data as pixels at the server and transmitting the pixels to the client;

determining, by the server, a second efficiency for each of the plurality of objects based on transmitting and rendering the visual data as pixels at the client;

determining, by the server, a relative efficiency for each of the plurality of objects for transmitting the visual data as pixels, the relative efficiency being a comparison of the first efficiency to the second efficiency;

upon determining the relative efficiency for the object of the plurality of objects meets or exceeds a threshold value, sending, by the server, the visual data for the object of the plurality of objects as graphics commands to be rendered at the client; and upon determining the relative efficiency for the object of the plurality of objects falls below the threshold value, rendering, by the server, the visual data for the object of the plurality of objects at the server and sending, by the server, the rendered visual data for the object of the plurality of objects to the client.

16. The computer program product of claim 15, wherein the relative efficiency is determined by comparing the number of pixels to be displayed with an amount of bandwidth needed to transmit the number of pixels to be displayed.

17. The computer program product of claim 15, wherein the threshold value accounts for network type, network quality, client resources, server resources, client workloads, server workloads, or user preferences.

18. The computer program product of claim 15, wherein the threshold value varies across different portions of an image.

19. The computer program product of claim 15, wherein the visual data corresponds to an image frame.

20. The computer program product of claim 19, wherein the determining the number of pixels to be displayed comprises:
- inserting codes into the graphics commands associated with the visual data to associate unique colors with different objects in the image frame;
- executing the graphic commands at the server to generate pixels for a render target;
- identifying colors of the pixels generated for the render target; and
- identifying a number of visible pixels for each different object of the image frame.

21. The computer program product of claim 20, wherein the codes inserted into the graphics commands associated with the visual data will cause the different objects in the image frame to be drawn with colors designated for the different objects.

22. The computer program product of claim 20, wherein the render target has a smaller width and height than an eventual target display for the visual data.

23. The computer program product of claim 20, wherein the render target has a surface format that describes a number of bits allocated to each pixel of the pixels generated for the render target and how the number of bits are divided between the unique colors.

24. The computer program product of claim 20, wherein identifying the number of visible pixels for each drawn object of the image frame comprises:
- identifying a number of pixels for a color of the unique colors that maps to an object of the different objects; and
- scaling the number of pixels for the color of the unique colors for an eventual target display for the visual data.

25. A server configured to determine whether to perform client-side rendering or server-side rendering on visual data in a client-server system with a client and the server, the server comprising:
- a memory that holds executable program code; and
- a processor capable of executing the executable program code, wherein the executable program code comprises code for:
  - identifying a plurality of objects in a frame associated with the visual data;
  - identifying graphics commands for each of the plurality of objects associated with the visual data;
  - determining a number of pixels for each of the plurality of objects to be displayed as a result of executing the graphics commands, the number of pixels being based on visual changes in an object of the plurality of objects;
  - determining a first efficiency for each of the plurality of objects based on rendering the visual data as pixels at the server and transmitting the pixels to the client;
  - determining a second efficiency for each of the plurality of objects based on transmitting and rendering the visual data as pixels at the client;
  - determining a relative efficiency for each of the plurality of objects for transmitting the visual data as pixels, the relative efficiency being a comparison of the first efficiency to the second efficiency;
  - upon determining the relative efficiency for the object of the plurality of objects meets or exceeds a threshold value, sending the visual data for the object of the plurality of objects as graphics commands to be rendered at the client; and
  - upon determining the relative efficiency for the object of the plurality of objects falls below the threshold value, rendering the visual data for the object of the plurality of objects at the server and sending the rendered visual data for the object of the plurality of objects to the client.

26. The system of claim 25, wherein the relative efficiency is determined by comparing the number of pixels to be displayed with an amount of bandwidth needed to transmit the number of pixels to be displayed.

27. The system of claim 25, wherein the threshold value accounts for network type, network quality, client resources, server resources, client workloads, server workloads, or user preferences.

28. The system of claim 25, wherein the threshold value varies across different portions of an image.

29. The system of claim 25, wherein the visual data corresponds to an image frame.

30. The system of claim 29, wherein the determining the number of pixels to be displayed comprises:
- inserting codes into the graphics commands associated with the visual data to associate unique colors with different objects in the image frame;
- executing the graphic commands at the server to generate pixels for a render target;
- identifying colors of the pixels generated for the render target; and
- identifying a number of visible pixels for each different object of the image frame.

31. The system of claim 30, wherein the codes inserted into the graphics commands associated with the visual data will cause the different objects in the image frame to be drawn with colors designated for the different objects.

32. The system of claim 30, wherein the render target has a smaller width and height than an eventual target display for the visual data.

33. The system of claim 30, wherein the render target has a surface format that describes a number of bits allocated to each pixel of the pixels generated for the render target and how the number of bits are divided between the unique colors.

34. The system of claim 30, wherein identifying the number of visible pixels for each drawn object of the image frame comprises:
- identifying a number of pixels for a color of the unique colors that maps to an object of the different objects; and
- scaling the number of pixels for the color of the unique colors for an eventual target display for the visual data.

* * * * *

UNITED STATES PATENT AND TRADEMARK OFFICE
CERTIFICATE OF CORRECTION

PATENT NO. : 9,240,030 B2  
APPLICATION NO. : 13/491930  
DATED : January 19, 2016  
INVENTOR(S) : Makarand Dharmapurikar Page 1 of 1

It is certified that error appears in the above-identified patent and that said Letters Patent is hereby corrected as shown below:

In column 12, line 4, in claim 11, delete "a the" and insert -- the --, therefor.

Signed and Sealed this  
Tenth Day of May, 2016

Michelle K. Lee  
*Director of the United States Patent and Trademark Office*